Patented Aug. 11, 1942

2,292,740

UNITED STATES PATENT OFFICE 2,292,740

WELD ROD FOR HARD FACING PURPOSES

Arthur T. Cape, Santa Cruz, Calif., and Mathias L. Eder, Canton, Ohio, assignors to Coast Metals, Inc., Canton, Ohio, a corporation of Ohio No Drawing. Application February 11, 1942, Serial No. 430,434

2 Claims. (Cl. 219—8)

This invention relates to weld rods for hard facing purposes.

A primary object of the invention is to provide a weld rod for this purpose which may be used for facing various articles, which have been subjected to wear and abrasion, but which is particularly valuable for facing piercing mill shoes used for piercing stainless steel billets.

The weld rod derives its usefulness for the above purposes from the fact that it is formed from a ferrous alloy which not only has high resistance to wear and abrasion, but has high resistance, as well, to heavy and repeated impacts, that is to say, it possesses high mechanical strength. It is also resistant to chemical corrosion and to oxidation at high temperatures, possesses strength at high temperatures, has the quality of being capable of forming a sound bond with the base metal, has a viscosity, in the molten condition, such as to permit exceedingly easy application thereof to the base metal, and is characterized by the fact that it is austenitic in the "as-cast" state.

The weld rod is preferably made from a ferrous alloy consisting of from 1% to 2% carbon, from 23% to 27% chromium, from 10% to 14% nickel, and from 6% to 10% molybdenum, the balance of the alloy being substantially all iron. An alloy within this range which has been found particularly useful as a facing for piercing mill shoes of the aforesaid character contains about 1% carbon, about 25% chromium, about 12% nickel and about 8% molybdenum.

We claim:

1. A weld rod for hard facing purposes, said rod comprising a ferrous alloy consisting of from 1% to 2% carbon, from 23% to 27% chromium, from 10% to 14% nickel, and from 6% to 10% molybdenum, the balance of the alloy being substantially all iron, said alloy having high resistance to wear and abrasion, as well as to heavy and repeated impacts, resistance to chemical corrosion and to oxidation at high temperatures, and possessing also strength at high temperatures, said alloy capable of forming a sound bond with a base metal and having a viscosity, in the molten condition, such as to permit exceedingly easy application thereof to a base metal, the alloy being further characterized by the fact that it is austenitic in the "as-cast" state.

2. A weld rod for hard facing purposes, said rod comprising a ferrous alloy consisting of about 1% carbon, about 25% chromium, about 12% nickel and about 8% molybdenum, the balance of the alloy being substantially all iron, said alloy having high resistance to wear and abrasion, as well as to heavy and repeated impacts, resistance to chemical corrosion and to oxidation at high temperatures, and possessing also strength at high temperatures, said alloy capable of forming a sound bond with a base metal and having a viscosity, in the molten condition such as to permit exceedingly easy application thereof to a base metal, the alloy being further characterized by the fact that it is austenitic in the "as-cast" state.

ARTHUR T. CAPE.
MATHIAS L. EDER.